UNITED STATES PATENT OFFICE.

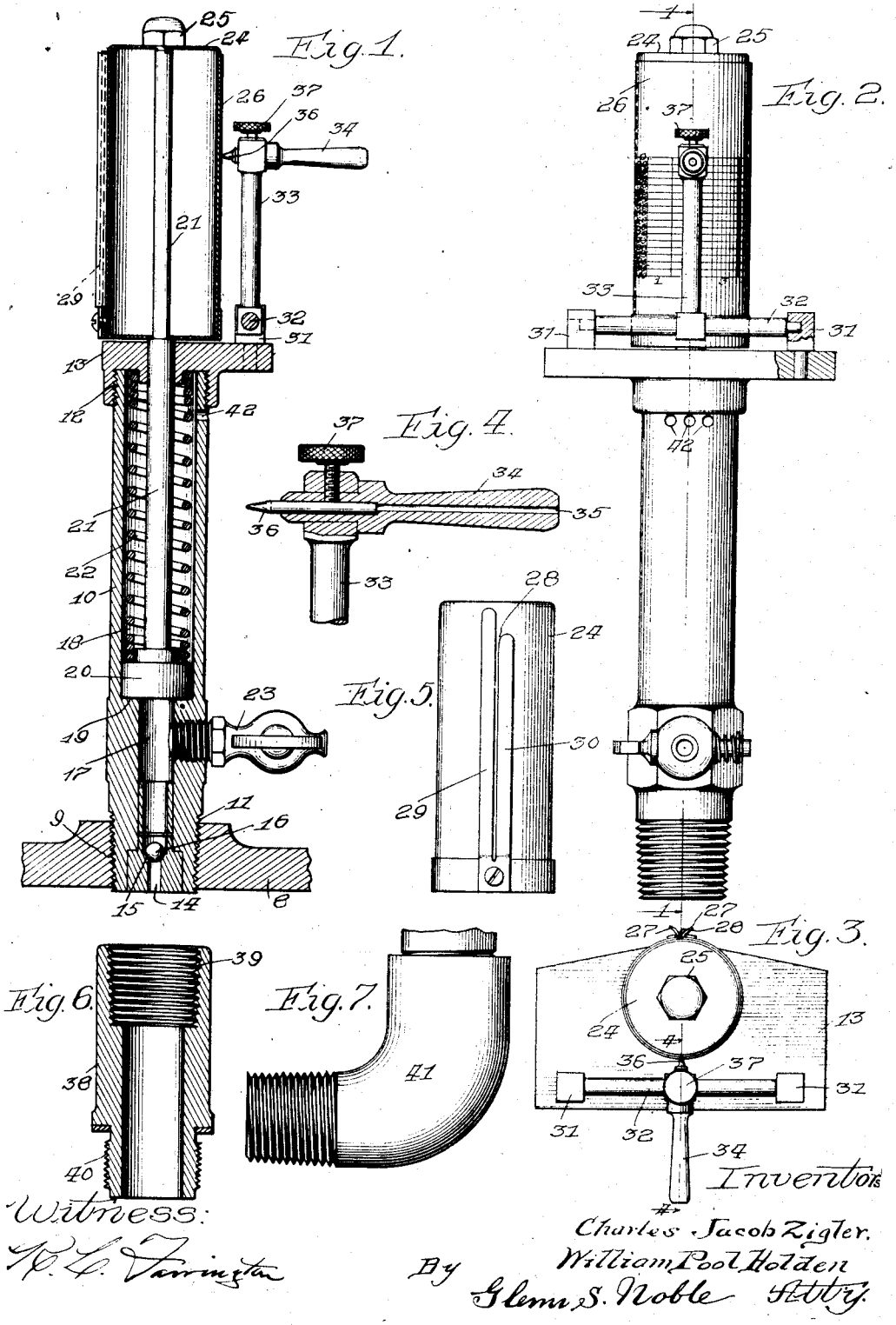

CHARLES JACOB ZIGLER AND WILLIAM POOL HOLDEN, OF CHICAGO, ILLINOIS.

COMPRESSION-RECORDER.

1,280,354.  Specification of Letters Patent.  Patented Oct. 1, 1918.

Application filed July 31, 1915. Serial No. 42,870.

*To all whom it may concern:*

Be it known that we, CHARLES JACOB ZIGLER and WILLIAM POOL HOLDEN, citizens of the United States, and residents of Chicago, in the county of Cook and State of Illinois, have invented certain new and useful Improvements in Compression - Recorders, of which the following is a specification.

This invention relates more particularly to a device for measuring and recording the compression in the cylinders of explosive or internal combustion engines. It is well understood that the efficiency, and to a certain extent, the successful operation of such engines depends largely upon the compression, but it is often difficult to determine whether the proper compression is being obtained, and what compression is necessary or desirable to give the greatest efficiency. In multiple cylinder engines, it is particularly difficult to secure satisfactory compression tests or records, while the engine is running, or to determine accurately which of the cylinders is defective when the engine is not running properly.

The objects of the present invention are to provide a simple and efficient pressure gage or compression recorder which may be readily attached to a cylinder of an internal combustion engine, and which will serve to measure and record the compression or pressure in such cylinder; to provide such a device which may be applied to the different cylinders of a multiple cylinder engine, and which will give a record of each cylinder all on the same sheet; and to provide such other novel features of construction and improvements as will appear more fully from the following description.

In the accompanying drawings illustrating our invention:

Figure 1 is a cross sectional view of a preferred form of our compression recorder, shown attached to a cylinder head;

Fig. 2 is a side elevation;

Fig. 3 is a plan view;

Fig. 4 is a sectional view taken on the line 4—4 of Fig. 3;

Fig. 5 is a detail showing the drum and holder for the recording strip;

Fig. 6 is a sectional view of a coupling; and

Fig. 7 is a side view of an L-coupling used for attaching the recorder to the cylinders.

As shown in these drawings, 8 represents a cylinder head having a threaded hole 9 therein, which is usually provided for the spark plug, and which is utilized for attaching our recorder. In the construction shown, this recorder comprises a cylinder 10, which is threaded at 11 to engage with the threaded hole 9, and is threaded at the upper end as indicated at 12, for engagement with a threaded cap 13. The lower end of the cylinder or casing 10 is provided with a relatively small inlet aperture 14 having a valve seat 15 at the upper end thereof, which is closed by a ball 16. The inlet 14 communicates with a slightly enlarged hole or passageway 17, which in turn opens into the main bore 18 of the cylinder, a shoulder 19 being formed at the lower end of the bore. A piston 20 fits closely within the cylinder 10, and is connected to a piston rod 21, which extends up through a hole in the head 13. A spring 22, preferably of the cylindrical type, is inserted between the piston 20 and the head 13, and tends to resist the upward movement of the piston. Shoulders are formed on the head and piston to hold the spring concentric with the piston and cylinder. This spring is preferably carefully selected, so that no adjustment of the same will be necessary. A pet-cock 23 connects with the opening 17, so as to allow the escape of air or gas when desired.

The top of the piston rod 21 is provided with a drum 24, which, as shown in the drawings, is made of a metal cylinder closed at both ends, and which is held in position by a nut 25 at the top of the rod. This drum serves to support strips of paper or fabric 26, which strips are wrapped tightly around the drum, and the projecting ends 27 brought out through a slot 28 in a resilient holder having fingers 29 and 30, which tend to hold the strip closely against the drum. The strips of paper 26 are marked or calibrated to indicate the pressure on the piston 20, such marking being preferably arranged to indicate the pounds per square inch of pressure on the piston. The strips 26 are also ruled vertically so as to provide a plurality of columns to be used in recording the compression in the different cylinders of the engine.

Two bearings 31 are secured to the head 13, and support a rotatable rod 32, which has an arm 33 secured thereto. The upper end of the arm 33 is provided with a handle 34, having a hole 35 through the center of the same, which hole is enlarged at the inner end to receive a pencil or marking device 36. The latter is held in position by means of a set screw 37.

The lower end 11 of the casing 10 may be threaded to engage with any of the usual threaded openings provided for spark plugs. There are several different standard threads for spark plugs, and a coupling or connection 38 may be utilized when the casing 10 is threaded for one size hole and the engine cylinders for a different size hole. In this instance the upper end of the coupling 38 is threaded as indicated at 39 to receive the threaded end 11, and the lower end of the coupling is threaded as indicated at 40, to fit the threaded opening in the engine cylinder. Where the spark plug hole is located in the side of the cylinder, a special L-connection or coupling 41 is provided.

When the engine is to be tested with our improved recorder, one of the spark plugs is removed and the recorder inserted in position. The pet-cock 23 is preferably opened, and the engine may be started running on the remaining cylinder or cylinders. The air or gas passing up through the inlet 14 will pass out through the cock 23, and do not affect the piston 20 until such time as is necessary to get the engine to running properly. In the meantime the pencil is swung away from the drum, so that no record is made. The cock 23 is then closed and the compressed air or gases from the engine cylinder will pass up through the passageway 14 into the opening 17, and will raise the piston 20 against the force of the spring 22, outlet openings 42 being provided in the cylinder 10 to allow the escape of air above the piston.

It will be seen that the valve 16 prevents the return of air or gas to the engine cylinder, and the compressed air or gas in the space below the piston 20 acts somewhat in the nature of a cushion and steadies the movement of the piston 20 during the repeated strokes of the engine piston. This prevents any violent movement or pounding of the piston 20. As the principal object of the valve 16 is the prevention of violent action of the piston 20, it is not necessary that this valve be absolutely tight, as more or less leakage of gas past the valve will not interfere with the proper operation of the device. The operator then raises the pencil or marking device 36 until it comes in contact with the paper having the scale thereon, and he is thereby enabled to make a record which indicates the compression in the engine cylinder. The horizontal lines on the paper are spaced or calibrated so that the compression may be read directly from the scale. It will also be seen that by turning the drum slightly, different records may be taken for each cylinder within the horizontal space provided on the paper for the same. These horizontal spaces are arranged for as many cylinders as may be desired, and, after one cylinder has been tested the instrument is applied to the next cylinder, and the drum is turned so as to bring the corresponding space opposite the pencil point, so that the record of the next cylinder may then be made. In this manner the record of all of the cylinders will be shown on a single piece of paper, and adjacent to each other, so that it may be readily seen whether all of the cylinders are operating properly. It is, of course, understood that the paper on the drum 24 is always arranged in proper position vertically on the drum, the drum being provided with a shoulder against which the lower edge of the paper is fitted.

When the proper compression is determined for any make of engine or type of engine, the corresponding horizontal line on the drum scale may be marked to indicate this as being a standard, and thereby the instrument serves to determine whether an engine is working at its highest efficiency, and in this way the instrument serves to standardize engines, or to give the user an opportunity to determine whether his engine is working in accordance with the proper standard for the same.

It is apparent that various changes may be made in the details of construction of our device, without departing from the spirit of our invention, and therefore we do not wish to limit ourselves to the exact construction or arrangement herein shown and described, except as specified in the following claims, in which we claim:

1. In a device of the character set forth, the combination of means for measuring the compression in a cylinder of an internal combustion engine, and means for recording such measurement including a drum which moves in conformity with the pressure, and a relatively stationary marking member for making a record on said drum.

2. A pressure gage adapted to be attached to an internal combustion engine, and a recording device connected therewith for recording the compression in the engine including a record receiving member connected with said gage and moving in accordance with the pressure, and a relatively stationary marking device for marking on said record receiving member.

3. A device for measuring the compression in an explosive engine, comprising a cylinder to be connected with the engine cylinder, a piston in said cylinder, a spring for resisting the movement of the piston, a piston rod connected with said piston and extending out through the cylinder, and means on said rod for carrying the record receiving element.

4. In a device of the character set forth, the combination of a cylindrical casing having one end threaded to engage with a threaded opening in the head of an engine cylinder, said casing having a reduced passageway in the threaded end thereof, which communicates with the main portion of the cylinder, an automatic check valve controlling said reduced passageway, a piston in said cylindrical casing, having a piston rod extending out through the head of the casing, a pressure indicating member carried by said rod, and a spring arranged between said piston and the head of the casing for resisting the upward movement of the piston.

5. In a compression recorder, the combination of a cylindrical casing having one end arranged to connect with a cylinder of an engine, this end being provided with a reduced passageway which communicates with a larger passageway, which in turn communicates with the main bore of the cylinder, an automatic check valve in said reduced passageway to prevent the escape of gas from the casing, a piston in said casing, a head for said casing, a piston rod connected with said piston and passing up through the head, a spring between said piston and the head, and a recording device connected with said rod for recording the movement of the piston.

6. In a compression recorder for internal combustion engines, the combination of a casing adapted to be connected with the engine, said casing having a reduced inlet passageway which communicates with an enlarged passageway, which in turn communicates with the main bore in the casing, a check valve at the upper end of the reduced passageway, a head for said casing, a piston fitting closely in the main bore of the casing, a compression spring between the head and piston, a piston rod extending from the piston up through said head, a drum connected with said rod, a strip of fabric having a scale thereon, secured to said drum, and a marking device connected with said head, adapted to engage with the drum, whereby the movement of the drum will be recorded on the strip.

7. In a compression recorder, the combination of a pressure gage adapted to be secured to the cylinder of an internal combustion engine, said gage having a rod projecting therefrom, a drum on said rod, resilient fingers secured to said drum, a strip of paper having a scale thereon, engaging with said drum and held in position by said fingers, and a marking device pivotally connected with said gage and adapted to be brought into engagement with the paper to record the longitudinal movement of the drum.

8. In a device of the character set forth, the combination with a pressure gage adapted to be connected to an internal combustion engine, of a longitudinally movable drum, a strip of paper secured to said drum, said paper having transverse markings for indicating the pressure, and vertical markings providing spaces for different cylinders, and a marking device connected with said gage and adapted to be brought into engagement with the paper, for recording the movement of the drum.

9. In a compression recorder for internal combustion engines, the combination of a cylindrical casing having one end threaded for engagement with the head of an engine, and having a cap at the opposite end, said casing having a passageway at the lower end communicating with the main bore, a check valve in said passageway, a pet-cock connected with said passageway, a piston in the main bore of the casing, a cylindrical spring between said piston and the head of the casing, a piston rod from said piston, extending up through said cap, a drum on said piston rod, means for securing a strip of paper to said drum, bearings on said cap, an arm pivotally connected with said bearings, a handle at the upper end of said arm, and a marking device secured to said handle and adapted to engage with the drum.

CHARLES JACOB ZIGLER.
WILLIAM POOL HOLDEN.